United States Patent
Haeseler et al.

[11] 3,880,985
[45] Apr. 29, 1975

[54] PROCESS FOR PRODUCTION OF SULPHUR TRIOXIDE

[75] Inventors: Harke Haeseler, Leverkusen; Ludwig Dorn, Cologne; Wilhelm Möller; Jörgen Wokulat, both of Leverkusen; Franz Rübsam, Leverkusen; Gerhard Heinze, Schildgen, all of Germany

[73] Assignee: Bayer Aktiengesellschaft, Leverkusen, Germany

[22] Filed: June 1, 1972

[21] Appl. No.: 258,598

Related U.S. Application Data

[63] Continuation of Ser. No. 39,347, May 21, 1970, abandoned.

[30] Foreign Application Priority Data

June 10, 1969  Germany............................ 1929388

[52] U.S. Cl. ............................................... 423/533
[51] Int. Cl............................................ C01b 17/68
[58] Field of Search .............. 423/522, 533; 23/288

[56] References Cited
UNITED STATES PATENTS

| | | |
|---|---|---|
| 2,449,190 | 9/1948 | Belchetz ............................ 423/533 |
| 2,853,361 | 9/1958 | Bryk et al. ............................ 23/288 |
| 3,259,459 | 7/1966 | Möller ............................ 423/533 X |
| 3,656,900 | 4/1972 | Drechsel et al. ............... 423/533 X |

FOREIGN PATENTS OR APPLICATIONS

| | | |
|---|---|---|
| 144,158 | 2/1962 | U.S.S.R. ............................ 423/533 |
| 304,269 | 1/1929 | United Kingdom .............. 423/533 |
| 617,979 | 2/1949 | United Kingdom .............. 423/533 |

*Primary Examiner*—Jack Cooper
*Attorney, Agent, or Firm*—Burgess, Dinklage & Sprung

[57] ABSTRACT

Sulphur trioxide is produced from $SO_2$ containing gases in a multi-stage catalytic conversion plant employing intermediate absorption. In the first stage the catalyst is maintained as a fluidised bed and the $SO_2$ containing gas is introduced into the bed at a temperature of up to about 300°C. The conversion in said fluidised bed is at least 60%. High overall conversions, with improved heat economy, are obtained.

11 Claims, 10 Drawing Figures

INVENTOR.
HARKE HAESELER; LUDWIG DORN; WILHELM MOLLER; JURGEN WOKULAT; FRANZ RUBSAM;
GERHARD HEINZE

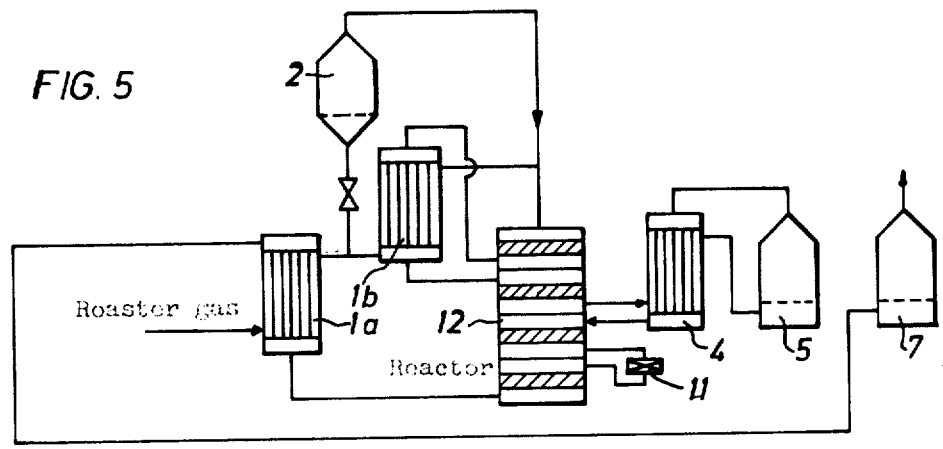

PROCESS FOR PRODUCTION OF SULPHUR TRIOXIDE

This is a continuation, of application Ser. No. 39,347 filed May 21, 1970, now abandoned.

Fixed bed catalysts are used for the large scale industrial production of sulphur trioxide by catalytic conversion of $SO_2$. The $SO_2$-containing gases are brought into contact with the catalyst masses in two or three stages in the conventional manner, the catalysts used being mainly vanadium oxide catalysts. The $SO_2$-containing gases must be preheated to temperatures of above 400°C, so that the reaction may proceed at the required velocity. Large quantities of energy are liberated in fractions of seconds, especially if the gases contain a high concentration of $SO_2$. Controlled removal of this energy is necessary in order to prevent overheating of the gases and of the catalyst masses in the catalyst tanks. Temperatures substantially above 600°C are to be avoided in order to prevent damage to the catalyst material. Since the optimum equilibrium temperature is substantially lower than the above mentioned temperature, depending on the $SO_2$ content and oxygen content of the gases, it is aimed to operate at the lowest possible temperature (420° to 460°C) in the last catalyst stage in order to obtain high overall $SO_2$ conversion. Lower degrees of conversion are accepted, especially in the first stage, because the high conversion velocities obtained at high temperatures then become more important.

The temperature is controlled by cooling the gases by heat exchange between the individual stages. Processes in which the catalyst mass is also cooled have also been described. This can be achieved either by blowing cold gases into the catalyst mass or by incorporating cooling systems in the catalyst tanks. With the processes described above, conversions of 98% are generally achieved in large scale industrial plants operating over prolonged periods.

The yield can be increased by intermediate removal of the sulphur trioxide formed. Thus, in recent years, many sulphuric acid plants have been put into operation in which the sulphur trioxide produced in the first stages is removed by absorption in sulphuric acid after a preliminary conversion of about 90%. The remaining gas which still contains $SO_2$ is thereafter converted almost quantitatively into $SO_3$ in a last stage at a relatively low temperature (German Patent Specifications Nos. 1,136,988 and 1,181,181). Large industrial plants of the type described above show conversions of 99.6% or more even when kept in operation for prolonged periods. The so-called double catalyst plants are capable of processing $SO_2$-containing gases of various origin, i.e., they can process sulphur combustion gases, the gases obtained from roasting pyrites as well as other metallurgical gases and decomposition gases from sulphate-containing waste products.

Since, in contrast to the normal catalytic process, the intermediate absorption requires additional energy (the reaction gases from the first catalyst stage are cooled prior to the intermediate absorption and are then reheated to the temperature required for starting the last catalyst stage after the intermediately formed sulphur trioxide has been removed), the so-called double catalyst process is advantageously carried out with a relatively highly concentrated $SO_2$-containing gas because the use of such a gas renders the process particularly economical. The highly concentrated gas not only provides a higher enthalpy for the heat economy of the process but the use of a concentrated $SO_2$-containing gas also enables a more economical construction and mode of operation of the plant to be used.

The above considerations concerning the energy relationships are generally valid only if the energy balance of the catalyst system is considered on its own. If the energy formed in the production of $SO_2$ is at least partly available for heating the gases in the catalyst system, one also may use gases which have a relatively low concentration of $SO_2$. It should be borne in mind, however, that the quantity of heat required to be exchanged also increases with increasing gas volume.

It was found that a gas with an $SO_2$ concentration of 8.5% or more can quite easily be converted by the so-called double catalyst process, especially if the catalyst material used in the first stage is, though active, yet insensitive to temperature. This applies both to sulphur combustion gases and to pyrite gases. When using very highly concentrated gases of the type which are nowadays obtainable commercially, however, the temperature produced in the first catalyst stage sets a limit to the use of highly concentrated gases, although the use of such gases would in itself be desirable owing to the resultant advantages such as higher catalyst volume/time yields.

Increasingly larger plants can be constructed by virtue of the introduction of so-called cold gas control in the technique of sulphuric acid production, i.e., the blowing in of part of the dry air between the stages of the catalyst apparatus. Converters having capacities of more than 900,000 kg of $SO_3$ per day have already been constructed. Plants of this type consist of a comparatively compact apparatus so that work has been done on the introduction of the fluidised bed technique for the production of sulphuric acid. A process has been described in which a gas containing 12% of $SO_2$ and only 13% of oxygen is converted to an extent of 98% in a four-layered converter. The heat is removed by cooling the layers with water or by the introduction of cold gas. It has also been proposed to confine the fluidised bed to a single stage preliminary catalyst with 70 to 90% conversion and then to continue conversion of the gases in a multi-stage fixed bed converter after removal of the dust entrained with the gases.

The introduction of the fluidised bed technique has numerous advantages. The size of the converter can be kept smaller. Gases having a higher percentage $SO_2$ content can be processed in the first stage, the removal of the heat of reaction entailing no difficulties. Specific catalyst poisoning by arsenic trioxide is reduced. Furthermore, water vapour and, when using dehydrated gases, also iron compounds have no influence on the activity of the catalyst. Since abrasion resistant catalysts are available as a result of the development of new types of catalyst masses, industrial chemists are interested in economically operating sulphuric acid plants using moving catalysts.

A process for the production of $SO_3$ by the catalyst process with intermediate absorption has now been found which is characterised in that $SO_2$-containing gases at a temperature of up to about 300°C are first converted into $SO_3$ to an extent of at least 60% in a fluidised bed of the catalyst material and the gases are then converted practically quantitatively into $SO_3$ in subsequent fluidised bed or fixed bed stages after they have been subjected to an intermediate absorption to remove the intermediately formed $SO_3$ after a conversion of about 75 to 95%.

The process is especially advantageous for a gas which has a high $SO_2$ content because temperature differences can be equalised by the intensive movement of the catalyst material in the fluidised bed and an almost isothermic reaction can be achieved by suitable adjustment of the conditions such as preheating of the gases, gas velocity, etc.

Employing the process according to the invention, an industrially produced gas having an $SO_2$ content of 20% could be converted to about 75% in a single stage fluidised bed catalyst, the temperature measured in the fluidised bed being approximately 520°C. A considerable quantity of energy is saved and additionally obtained as compared with the process using a fixed bed catalyst. When using a gas from roasting, which has to be cooled to 50°C in the course of the purification operations, the gas need only be heated to a temperature of 100° to 300°C, and gases obtained from the combustion of sulphur can be cooled to the above mentioned temperature range. By virtue of the efficient heat exchange in the moving catalyst layer, a very high degree of conversion can be achieved in a single catalyst stage.

Although the first fluidised bed layer may be followed by subsequent stages with a moving catalyst material, this may not be very economical. Homogenisation of the temperature in the layers becomes less significant owing to the diminishing production of heat. Moreover, the reaction velocity falls with decreasing temperature, with the result that a very large quantity of the catalyst is necessary for obtaining the required conversion. It is only to a limited extent that production can be increased by increasing the gas velocities because otherwise the fluidised bed would be set in turbulent motion so that solid substance would be carried away. In order to prevent discharge of the catalyst material from the converters, the gas velocity must not be above the velocity of the moving particles in suspension.

In a preferred embodiment of the process of the invention, the $SO_2$-containing gases are first converted in a fluidised bed. Catalyst particles 0.2 to 4 mm and preferably 0.4 to 2 mm in diameter having a high mechanical strength and an especially high resistance to abrasion are used for the fluidised bed.

The production of abrasion resistant catalyst carriers for fluidised bed reactions is well known in petroleum chemistry. Especially suitabel porous, abrasion-resistant catalyst carriers in the form of beads can be prepared by suspending solids in an aqueous stable silicic acid sol which have a specific surface areas of 150 to 400 $m^2/g$ according to the method of Brunauer, Emmett and Teller (BET) and gelling the resulting suspensions by mixing them with an aqueous suspension of hydrated magnesium oxide them with an aqueous suspension of hydrated magnesium oxide in a quantity of 0.1 to 3% by weight of MgO based on the anhydrous granulate and distributing this gellable mixture in the form of droplets in a liquid which is immiscible with water. The granulate obtained is then separated from the liquid and hardened by a heat treatment at a temperature of 50° to 1,000°C. The solids added to the silica sol are 20 to 60% by weight of silicic acid fillers having a specific surface area of 20 to 200 $m^2/g$ according to BET and 5 to 30% by weight of clay minerals from the group of kaolinite, montmorillonite and attapulgite. For the sulphuric acid production, the catalyst carriers are then impregnated with potassium or sodium vanadate solutions, heated to a temperature of about 500°C and lastly sulphated in the usual manner at a temperature of 450°C in the presence of gases containing a small amount of $SO_2$. The catalysts are then ready for use for the oxidation of $SO_2$ to $SO_3$. According to another proposal, improved catalysts can be obtained by treating the catalyst carriers with an acid to remove the acid-soluble cations before the impregnation with vanadate solution.

The $V_2O_5$ contents of the finished catalysts should be about 5 to 6% by weight, based on the heat treated catalyst carrier. The quantity of the catalyst to be used depends on the required degree of conversion and on the $SO_2$ concentration in the gas used as the starting material. Conversions in the first stage will generally be restricted to 80% in order to avoid excessive pressure losses. If the time of contact with the catalyst is 1.2 to 4 seconds, the quantity of the catalyst required will be 0.5 to 1.0 $kg/m^3$ of gas calculated at normal conditions containing $SO_2$ at a concentration of from 10% to 16%.

The process according to the invention will now be explained more fully with reference to FIGS. 1 to 6.

BRIEF DESCRIPTION OF THE DRAWINGS

FIG. 5 shows diagrammatically a normal installation which has been improved by the attachment of a fluidised bed converter.

FIG. 6 illustrates the use of multiple fluidised beds. In the Figures, the reference numerals have the following meanings:

1. heat exchange;
2. catalytic reactor, 1st stage (fluidised catalyst);
3. filter;
4. heat exchanger prior to intermediate absorption;
5. intermediate absorber;
6. catalytic reactor, fixed bed, after absorption;
6b catalytic reactor, fluidised bed, after absorption;
6c catalytic reactor, fixed bed, after absorption;
6d catalytic reactor, fixed bed, after absorption;
7. final absorber;
8. sulphur combustion furnace;
9. steam boiler;
10. fixed bed of first catalyststage
10a fluidised bed reactor;
11. cooling between the steps of the catalyst furnace (2nd stage);
12. catalyst furnace with four fixed beds, two before and two after the intermediate absorption;
13. gas - catalyst separator.

Figure 1:
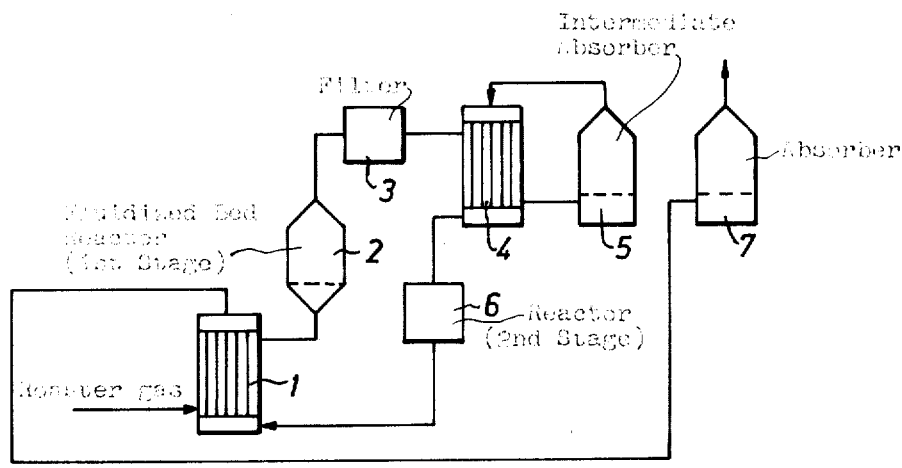
FIGS. 1, 3 and 3b illustrate arrangements for carrying out the process using gases obtained from roasting pyrites.

FIG. 1 represents the simplest embodiment of the process of the invention for the production of $SO_3$ or sulphuric acid using gases obtained from roasting pyrites. This process can be carried out in a similar manner using metallurgical or decomposition gases. In the heat exchanger 1, the cold, purified roasting gas is first heated to the necessary temperature. The heat exchanger is heated by means of the gases leaving the fixed bed converter 6. The $SO_2$ content of the roasting gases may be between 5 and 20 volume per cent. In the fluidised bed converter 2, the roasting gas undergoes 65 to 85% conversion to $SO_3$ at a temperature of about 480° to 580°C, preferably at a temperature of between 490° and 530°C. — If the conversion of the gases is below 75% then the gases may be passed through a scond fluidised bed reactor of a fixed bed reactor to achieve a total conversion of at least 75% before the intermediate absorption. However this embodiment is not considered in FIG. 1. — The gases are then passed over the filter 3 to remove dust formed by abrasion of the catalysts. The reaction gases are cooled in the heat exchanger 4 and then freed from previously formed $SO_3$ by washing with sulphuric acid in a absorption tower 5. The gas freed from $SO_3$ is then reheated up to a temperature of about 420°C in the heat exchanger 4 where it is used for preheating the roasting gases and it is then freed from $SO_3$ in the final absorber 7. Even if the fixed bed catalyst is equipped with only one stage, conversions of 98.8% can be achieved.

Figures 2, 2B:
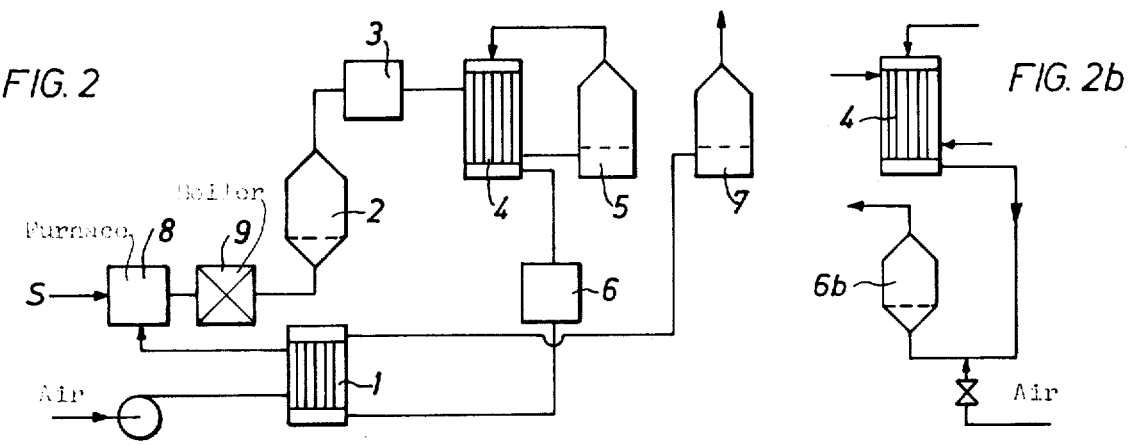
FIGS. 2, 2b and 4, 4b and 4c illustrate arrangements used for reacting gases obtained from the combustion of sulphur.

FIG. 2 shows the simplest embodiment of the process of the invention for processing gases obtained from the combustion of sulphur. The sulphur is burned in the sulphur burner 8. The combustion gases are cooled in 9 with recovery of steam and then enter the fluidised bed catalyst 2. The gases are then carried to the intermediate absorption stage 5 via the filter 3 and the heat exchanger 4 and are then returned to the heat exchanger 4. The reheated gases then enter the fixed bed catalyst 6 and are carried from there to the final absorption 7 via the heat exchanger 1. The air needed for combustion is preheated in the exchanger 1. When using the gases obtained from the combustion of sulphur, the fixed bed converter 6 may again be single stage or multi-stage.

Figure 3:
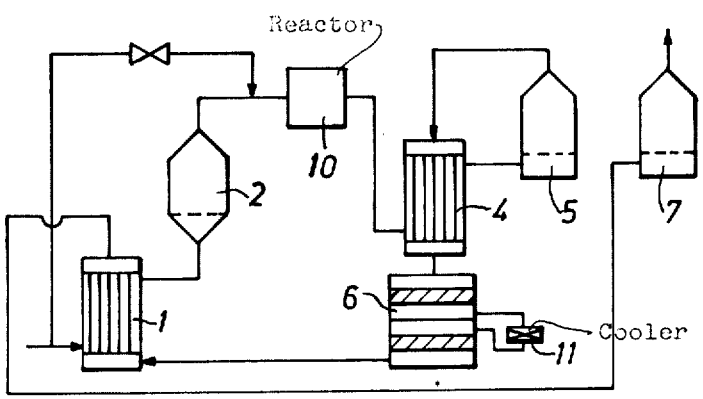
Figure 4:
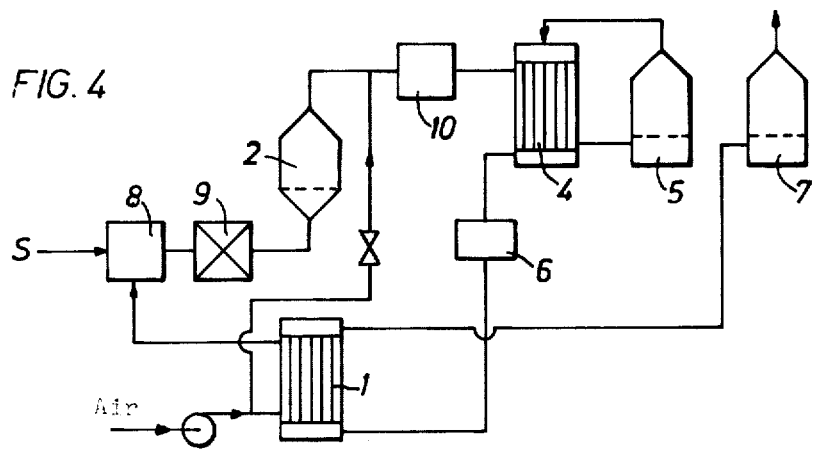

Substantially higher conversions can be achieved with the arrangements according to FIGS. 3 or 4. FIG. 3 illustrates an arrangement in which a fixed bed catalyst is interposed between the fluidised bed catalyst and the intermediate heat exchanger. In this method of procedure, it is advantageous to cool the gases leaving the fluidised bed converter to a temperature of 450° to 490°C by blowing in dry, cold roasting gases or dry, cold air. The reference numerals in FIG. 3 have the same meanings as in FIGS. 1 and 2. The reference numeral 10 indicates the fixed bed catalyst between the fluidised bed converter and the heat exchanger 4. In this case, the fixed bed catalyst 6 was equipped with two stages with intermediate cooling 11. Both when using pyrites roasting gases or sulphur combustion gases, conversions of more than 99.8% can be achieved with this arrangement. While FIG. 3 shows the arrangement for processing roasting gases, FIG. 4 shows the corresponding arrangement for processing sulphur combustion gases.

Figure 3B:
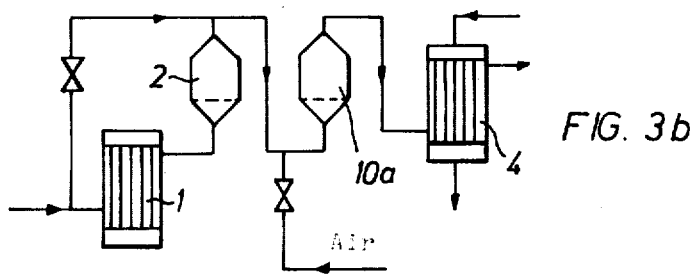

FIG. 3b illustrates an alternative to the plant illustrated in FIG. 3. In FIG. 3b the second reactor is a fluidised bed reactor 10a.

Figure 4B:
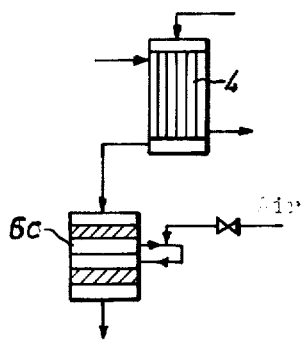
Figure 4C:
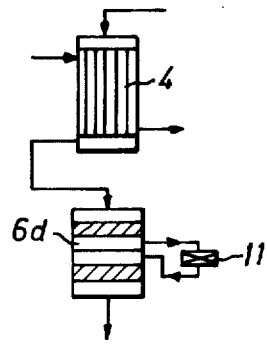

FIGS. 4b and 4c indicate alternatives to the plant illustrated in FIG. 4. In FIG. 4b, fixed bed reactor 6c, downstream of the intermediate absorption, comprises two catalyst beds, with provision for introducing of air between the beds. In FIG. 4c, the reactor 6d comprises two fixed beds, and the gas is cooled in heat exchanger 11 between beds.

In FIG. 6, there are two fluidised beds, 2 and 10a, upstream of the intermediate absorber 5, and one fluidised bed 6b downstream of the absorber 5. Catalyst may be carried from reactor 2, to reactor 10a, and this is compensated for by separator 13, which separates and directs catalyst to reactor 2.

Existing plants can also be considerably improved by attaching a fluidised bed catalyst. FIG. 5 shows an arrangement for the production of sulphuric acid from the waste gases obtained by roasting pyrites. In this arrangement, the about 99% conversion obtained with a four-stage catalyst with intermediate absorption after the second catalyst stage is increased to a total conversion of at least 99.8% by fitting a fluidised bed catalyst in front of the first stage. Gases obtained from the combustion of sulphur may be used in an analogous manner. The temperature at the outlet of the first stage of the fluidised bed converter can be considerably lowered when, as a result of arranging a fluidised bed catalyst in front of the installation, the gas which has already been partly converted can be supplied to the first stage of a conventional fixed bed converter. This helps to preserve the structural material and increase the length of life of the catalyst.

The process according to the invention will now be described more fully with reference to Examples.

Example 1a (FIG. 1)

50,000 $Nm^3/h$ of a roasting gas containing 9.1% of $SO_2$ and approximately 9% of $O_2$ are introduced at a temperature of 50°C into the plant shown in FIG. 1. This gas is heated to 300°C in the heat exchanger 1 and then introduced into the fluidised bed apparatus 2 which has been preheated to over 440°C with hot air. In this apparatus 2, 33,000 kg of a granular vanadium catalyst with a high abrasion resistance are kept in moving suspension by the stream of gas which has a velocity of 0.15 m/second (calculated on the basis of normal conditions and the cross-sectional area of the reactor, i.e., normal conditions and an "empty" converter) in the fluidised bed apparatus. A temperature of 520°C becomes established in the catalyst bed and 84% of the $SO_2$ introduced is converted into $SO_3$.

The gas then passes through a dust filter and is cooled to about 160° to 220°C in the last heat exchanger 4. The $SO_3$ is then removed from the gas in the intermediate absorber 5, sulphuric acid being obtained. The gas thereafter still contains 1.75% of $SO_2$ and approximately 5.2% of $O_2$ and has been cooled to a temperature of 60°C. It is used in the heat exchanger 4 as a cooling agent for the gas entering the intermediate absorber and is itself heated to about 420°C. It is then passed through the fixed bed catalyst 6 where it is heated to about 470°C and 94% of the $SO_2$ contained in it is converted into $SO_3$. The overall conversion in the whole apparatus is 99%. The gas leaving the catalyst layer 6 serves as a heating medium in the heat exchanger 1 in which it is cooled to 160°C to 220°C. In the final absorber 7, the remaining $SO_3$ is removed from the gas and recovered as sulphuric acid.

Example 1b (FIG. 3, 3b)

Using a modification of the process illustrated in Example 1a, the gas leaving the fluidised bed apparatus 2 at a temperature of about 520°C is cooled to approximately 460°C by blowing cold, dry air in at the rate of 7,300 $Nm^3/h$ and it is then conveyed to a fixed bed catalyst 10.

In this catalyst bed, up to 94% of the $SO_2$ in the gas in converted to $SO_3$, the outflow temperature being approximately 480°C. Instead of a fixed bed catalyst as shown in FIG. 3, a second fluidised bed 10a, as shown in FIG. 3b, may be used through which the gas flows at a rate of 0.17 m/second based on an empty converter and normal conditions. The quantity of the catalyst in converter 10a is in the region of 20,000 kg. After the gas has passed through the second catalyst, it is passed through the intermediate absorption system and the fixed bed catalyst as already described above but the $SO_2$ content of the gas leaving the intermediate absorber is now only 0.55%. The inlet temperature in the fixed bed catalyst 6 is 410°C, the outlet temperature 426°C. The conversion in the whole apparatus is over 99.8%. The gas is conveyed to the final absorber 7 via the heat exchanger 1 as described above. In this final absorber 7, the remaining $SO_3$ is recovered as sulphuric acid.

Example 2

An $SO_2$-containing gas cooled to 250°C which contains 14% of $SO_2$ and 7% of $O_2$ and which has been obtained by the combustion of sulphur in the sulphur furnace 8 and cooled to 230°C in an adjustable heat exchanger using a mixture of steam and water as a cooling agent is fed into a apparatus as shown in FIG. 2. The rate of supply of the gas mixture is 50,000 Nm³/h. After leaving the steam producer 9, the gas is introduced from below into the fluidised bed apparatus 2 which is closed at the bottom by a grating which is permeable to gas. This fluidised bed apparatus 2 was preheated to about 450°C with hot air before the plant was set into operation. On this grating are 27,300 kg = 42,000 l of a vanadium catalyst prepared on a basis of silicic acid and containing 4.8% of $V_2O_5$. A fluidised bed is produced under the conditions described above. On leaving the catalyst chamber, the gas has undergone 75% conversion to $SO_3$ and is at a temperature of 545°C. The loss of pressure in the gas in the catalyst chamber including the grating is in the region of 1,000 mm of a water column. The velocity of the gas is 0.15 m/sec. based on an empty converter and normal conditions. In the filter 3 which follows this apparatus, dust, impurities of the sulphur which have undergone combustion and catalyst abrasion are removed from the gas. The purified gas is cooled to about 200°C in the following heat exchanger 4 and freed the $SO_3$ produced by being scrubbed with strong sulphuric acid in a absorption tower of the conventional construction, the gaseous mixture being cooled to about 60°C in the process. The $SO_3$ which has been dissolved out of the gas is removed as sulphuric acid and constitutes part of the product. The gas which has been freed from $SO_3$ and cooled to 60°C, which still contains about 4.2% of $SO_2$, serves as a cooling agent in the heat exchanger for the gaseous mixture flowing to the absorber, and is heated to 440°C in the process. The gas can then be fed to fixed bed converter 6 and on to heat exchanger 1, and absorber 7. Alternatively, as shown in FIG. 2b it can be fed to a fluidised bed converter 6b. Before entering converter 6b, cold, dry air is fed into the gas at such a rate that the oxygen content of the gas mixture is increased from 2 to about 4.9% of $O_2$, i.e., air is blown in at the rate of about 7,500 Nm³/h. The $SO_2$ content is thereby reduced to 3.34% and the temperature is reduced to 380°C. The gas underhoes 95% conversion in the catalyst apparatus 6b. The total conversion is, therefore, 98.7%. The gas leaving the fluidised bed 6b at a temperature of about 480°C can be cooled in the conventionel manner by blowing in cold air and passed through a fixed bed converter so that a considerably higher conversion is achieved. In an alternative embodiment shown in FIG. 4b, the gas leaving the heat exchanger 4 with an $SO_2$ content of 4.2% and at a temperature of 440°C is advantageously passes through the two-stage fixed bed catalyst furnace 6c. In the first stage, the $SO_2$ content undergoes approximately 60% conversion to $SO_3$, the gas heating up to 520°C. The temperature is reduced in a suitable manner to 430°C, for example by blowing in cold, dry air at a rate of 10,000 Nm³/h, the oxygen content being thereby simultaneously increased. As the gas passes through the second stage, it gets heated to 470°C. The total conversion is over 99.8%. The gas leaving the catalyst apparatus 6c is cooled to about 160° to 220°C in the heat exchanger 1 and the $SO_3$ is recovered from it as suphuric acid in the final absorber 7. The cooling agent used for the heat exchanger 1 is dry air which, after it has been heated, is delivered as air of combustion to the sulphur furnace 8.

Another advantageous variation of the process is depicted in FIG. 4. Gas which contains 14% of $SO_2$ and 7% of $O_2$ and which has been cooled to 230°C in the steam boiler is passed through the fluidised bed apparatus 2 at a rate of 50,000 Nm³/h as described above, undergoing 75% conversion in the process and being heated to a temperature of 545°C. 8,800 Nm³ per hour of cold, dry air are then blown into the hot gas so that the temperature of the gas is reduced to about 470°C. The gas than pases through a fixed bed converter 10 and leaves it at a temperature of 530°C with approximately 92% of its $SO_2$ content converted to $SO_3$. The gas is now cooled in the heat exchanger 4 to 160°C to 220°C and in the intermediate absorber (or an oleum absorber with sulphuric acid intermediate absorber arranged after it), it is freed from its $SO_3$ which is removed as an acid product. The gas cooled to 60°C in the intermediate absorber serves as a cooling agent in the heat exchanger 4 in which it is heated to 420°C. The gas is passed through the second fixed bed converter 6 which in this case is a one-stage converter. The gas undergoes 96% conversion in this converter and its outflow temperature reaches about 450°C. The total conversion in the apparatus is in the region of 99.7%. Referring to FIG. 4c, further improvement of the conversion can be achieved by replacing the single-stage second catalyst apparatus 6 with a two-bed converter 6d with intermediate cooling by means of heat exchanger 11.

Example 3

In an apparatus according to FIG. 1, a gas containing 12.3% of $SO_2$ and 8.2% of $O_2$ is passed through the fluidised bed catalyst apparatus, 2. The inlet temperature is 287°C, the temperature in the bed 525°C and the velocity of gas in the fluidised bed apparatus is 0.3 m/second, base on an empty converter and normal conditions. On leaving the fluidised bed apparatus, the gas had undergone 63.7% conversion of its $SO_2$ content to $SO_3$. The following stages of processing the gas are carried out as in Examples 1 and 2. The quantity of the catalyst 2 used under the conditions indicated in this example is 20.5 kg per 1,000 kg of $SO_3$ produced per day.

A gas which has been produced by the combustion of sulphur can be processed by an analogous manner in an apparatus according to FIG. 2.

Example 4

A gas containing 5.0% of $SO_2$ and an excess of oxygen is introduced into the fluidised bed apparatus 2 in the apparatus according to FIG. 1. The inlet temperature of the fluidised bed apparatus is 302°C and the bed temperature 531°C. When the gas leaves the fluidised bed apparatus, 85.3% of the $SO_2$ introduced has been converted into $SO_3$. The rate of flow of the gas in the fluidised bed apparatus is 0.16 cm/sec, based on an empty converter and normal conditions, and the quantity of the catalyst in the fluidised bed apparatus is 138 kg per 1,000 kg of $SO_3$ produced per day. Subsequent processing of the gas is carried out in the conventional manner.

A gas which has been produced by the combustion of sulphur can be processed in an analogous manner in an apparatus according to FIG. 2.

Example 5

A gas having an $SO_2$ content of 16.2% is introduced into an apparatus shown in FIG. 1. The inlet temperature in the fluidised bed apparatus 2 is in the region of 210°C and the temperature of the bed 546°C. The conversion attained is in the region of 68%. The velocity of the gas in the fluidised bed apparatus is 0.15 m/sec, the quantity of catalyst in the fluidised bed 31 kg per 1,000 kg of $SO_3$ produced per day. The subsequent stages of the process are carried out as described in Examples 1 and 2.

The process can be carried out in an analogous manner according to FIG. 2 (combustion of sulphur).

What is claimed is:

1. A process for the catalytic production of sulfur trioxide comprising:
   a. introducing an $SO_2$ containing gas having an $SO_2$ concentration of at least 8.5% by volume, said gas containing oxygen and being at a temperature of no greater than 300°C. into a fluidized bed and contacting said gas in said fluidized bed until at least 60% of the $SO_2$ in said gas is converted to $SO_3$ in said fluidized bed;
   b. introducing the gaseous effluent from said fluidized bed, without any subsequent catalyst stage into an intermediate absorption stage and therein absorbing $SO_3$ produced in said fluidized bed; and
   c. passing unconverted $SO_2$ from said intermediate absorption stage into at least one further catalyst stage under conditions effective to convert the unreacted $SO_2$ to $SO_3$, whereby the total conversion of $So_2$ to $SO_3$ is about 99%.

2. A process according to claim 1 wherein the $SO_2$ in the gas introduced into the fluidized bed has a concentration of 10 to 16% by volume.

3. A process according to claim 1 wherein the unconverted $SO_2$ from said intermediate absorption stage is passed through a plurality of subsequent catalyst stages to convert said $SO_2$ to $SO_3$.

4. A process according to claim 1 wherein the gaseous effluent from the fluidized bed is cooled prior to introduction into said intermediate absorption stage.

5. A process according to claim 1 wherein said gaseous effluent from said fluidized bed is introduced into said intermediate absorption stage without any intermediate cooling.

6. Process according to claim 1, wherein the conversion of $SO_2$ to $SO_3$ prior to said intermediate absorption is 75 to 95%.

7. Process according to claim 1, wherein said catalyst stage following said absorption is a fixed bed catalyst stage.

8. Process according to claim 7, wherein the fixed bed catalyst stage following the intermediate absorption comprises two catalyst beds and the gas is cooled during transfer from the first bed to the second bed.

9. Process according to claim 1, wherein said catalyst stage following said absorption is a fluidised bed catalyst stage.

10. Process according to claim 1 wherein in the fluidized bed of the catalyst a residence time of the gas between 1.2 and 4 seconds is maintained.

11. Process according to claim 10 wherein in the fluidized bed of the catalyst the amount is between 0.5 and 1.0 kg/m³ of $SO_2$ containing gas.

* * * * *